United States Patent
Inage

(10) Patent No.: US 7,551,997 B2
(45) Date of Patent: Jun. 23, 2009

(54) VEHICLE BEHAVIOR CONTROL APPARATUS

(75) Inventor: Takaaki Inage, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 12/207,917

(22) Filed: Sep. 10, 2008

(65) Prior Publication Data
US 2009/0069978 A1 Mar. 12, 2009

(30) Foreign Application Priority Data
Sep. 11, 2007 (JP) ............ P.2007-235291

(51) Int. Cl.
G06F 19/00 (2006.01)
B62D 6/00 (2006.01)

(52) U.S. Cl. ............ 701/41; 701/34; 701/29; 701/70; 340/438

(58) Field of Classification Search ............ 701/29–35, 701/22, 41–44, 70; 180/443, 446; 340/438
See application file for complete search history.

(56) References Cited

U.S. PATENT DOCUMENTS 7,245,995 B2 * 7/2007 Kueperkoch et al. .......... 701/29

7,493,201 B2 * 2/2009 Ghoneim et al. .............. 701/41

FOREIGN PATENT DOCUMENTS

| JP | 7-149251 | 6/1995 |
| JP | 2001-171501 | 6/2001 |

\* cited by examiner

Primary Examiner—Richard M. Camby
(74) Attorney, Agent, or Firm—Greenblum & Bernstein, P.L.C.

(57) ABSTRACT

A control section includes a first turning direction estimating mechanism for estimating a first turning direction from a sign of the first yaw rate when an absolute value of the first yaw rate is a first threshold value or more, a second turning direction estimating mechanism for estimating a second turning direction from a sign of a difference between the second yaw rate and the second threshold value when the second yaw rate is not less than or not more than the second threshold value, a vehicle turning direction judging mechanism for judging that the direction when the first and second turning directions are the same is a turning direction of the vehicle and an abnormality judging mechanism for judging that the yaw rate sensor is abnormal when the turning direction and the direction of the actual yaw rate differs from each other.

10 Claims, 7 Drawing Sheets

VEHICLE BEHAVIOR CONTROL APPARATUS

BACKGROUND OF THE INVENTION

1. Field of the Invention

The present invention relates to a vehicle behavior control apparatus which controls the behavior of a vehicle according to output values of at least a steering angle detection means and a yaw rate detection means.

2. Description of Related Art

Recently, a vehicle is provided with a vehicle behavior control apparatus which controls the behavior of the vehicle by comparing an estimated yaw rate, which is based on a steering angle and a traveling speed of the vehicle, with an actual yaw rate which is detected by a yaw rate detection means. In general, in this vehicle behavior control apparatus, when an abnormality is caused in the yaw rate detection means, there is a fear of deteriorating the normal control of the vehicle behavior. Therefore, in order to reflect the abnormality of the yaw rate detection means on the control of the vehicle, it is important to judge the abnormality of the yaw rate detection means.

Therefore, for example, Japanese Patent Unexamined Publication JP-A-7-149251 discloses a vehicle control unit which judges the occurrence of a failure of a yaw rate detection means when a difference between an estimated yaw rate and an actual yaw rate is increased to a value not less than a reference value. Further, the Japanese Patent Unexamined Publication JP-A-2001-171501 discloses a vehicle behavior control apparatus in which the occurrence of an abnormality of a sensor is judged when a direction of the yaw moment, which is generated in a vehicle according to the deviation between a target yaw rate which is set according to a steering angle and an actual yaw rate, is opposite to a direction of the yaw moment given by a steering operation.

When an abnormality is caused in a yaw rate detection means under the condition that a vehicle is turning and a direction of the output value (the actual yaw rate) of the yaw rate detection means is opposite to an actual turning direction of the vehicle, there is a possibility that the behavior of the vehicle is affected.

SUMMARY OF THE INVENTION

An object of the present invention is to provide a vehicle behavior control apparatus for positively and quickly judging an abnormality of a yaw rate detection means in the circumstances in which the vehicle is turning.

In order to achieve the above object, there is provided a vehicle behavior control apparatus including:

a steering angle detection means for detecting a steering angle of a vehicle;

a lateral acceleration detection means for detecting a lateral acceleration of the vehicle;

a yaw rate detection means for detecting an actual yaw rate of the vehicle; and a control section for controlling a behavior of the vehicle according to output values outputted from the steering angle detection means and the yaw rate detection means, wherein the control section includes:

a first turning direction estimating means for estimating a first yaw rate according to the output value of the steering angle detection means and estimating a first turning direction from positive and negative of the first yaw rate when an absolute value of the first yaw rate concerned is not less than a first threshold value;

a second turning direction estimating means for estimating a second yaw rate according to an output value of the lateral acceleration detection means and estimating a second turning direction from positive and negative of a difference between the second yaw rate and a second threshold value when the second yaw rate is not less than or not more than the second threshold value;

a vehicle turning direction judging means for judging that the direction when the first turning direction and the second turning direction are the same is a turning direction of the vehicle; and an abnormality judging means for judging that the yaw rate detection means is abnormal when the turning direction of the vehicle and the direction of the actual yaw rate are different from each other.

According to the vehicle behavior control apparatus as described above, since the yaw rate detection means is judged abnormal when the first turning direction estimated from an output value of the steering angle detection means according to an intention of a driver and the second turning direction estimated from an output value of the lateral acceleration detection means according to the behavior of a vehicle are the same and only a turning direction shown by the actual yaw rate is different. Accordingly, an abnormality of the yaw rate detection means caused in the circumstances in which the vehicle is turning can be positively judged. Whether the yaw rate detection means is abnormal is judged by judging whether the turning direction of the vehicle and the turning direction shown by the actual yaw rate are different from each other. Therefore, it is possible to quickly judge an abnormality of the yaw rate detection means.

The second turning direction estimating means may set the second yaw rate, which is a yaw rate at the time when an absolute value of the first yaw rate exceeds the first threshold value, to be the second threshold value.

Due to this, when the second turning direction is estimated, the first yaw rate, which is estimated from an output value of the steering angle detection means, is used. Therefore, it is possible to take into account of a state of a road surface on which the vehicle is traveling, especially, an inclination in the lateral direction of the vehicle. Thus, it is possible to more accurately estimate the second turning direction. Accordingly, the occurrence of an abnormality of the yaw rate detection means can be more positively judged.

The abnormality judging means may judge an abnormality of the yaw rate detection means when a predetermined period of time has passed from a point of time when it is judged that the turning direction of the vehicle and the direction of the actual yaw rate are different from each other.

Due to this, the occurrence of an abnormality is judged after a predetermined period of time has passed from a point of time when it is judged that the turning direction of the vehicle and the direction of the actual yaw rate are different from each other. That is, the occurrence of an abnormality is judged after a state of two different directions has continued for a predetermined period of time or more. Accordingly, an erroneous judgment can be prevented and an abnormality of the yaw rate detection means can be more positively judged.

The direction of the actual yaw rate may be a direction estimated from the positive and the negative of the output value of the yaw rate detection means.

Due to this, a direction of the output value of the yaw rate detection means can be easily and quickly estimated. Therefore, an abnormality of the yaw rate detection means can be more quickly judged.

The direction of the actual yaw rate may be a direction estimated from the positive and the negative of a difference between the output value right before the output value of the yaw rate detection means shows a change by a value not less than the third threshold value and the output value after the output value of the yaw rate detection means has changed by a value not less than the third threshold value.

Due to this, when an output value of the yaw rate detection means changes by a value not less than the third threshold value, a direction of the actual yaw rate is estimated. Accordingly, an erroneous judgment can be prevented and an abnormality of the yaw rate detection means can be positively judged. Since a direction of the actual yaw rate is quantitatively estimated and compared with a turning direction of the vehicle, a direction of the actual yaw rate can be more accurately estimated and an abnormality of the yaw rate detection means can be more positively judged.

According to the vehicle behavior control apparatus of the present invention, it is possible to positively and quickly judge an abnormality of a yaw rate detection means in the circumstances in which the vehicle is turning. Due to the foregoing, an abnormality of the yaw rate detection means can be positively and quickly reflected on the behavior control of a vehicle.

DETAILED DESCRIPTION OF THE PREFERRED EMBODIMENTS

Figure 1:
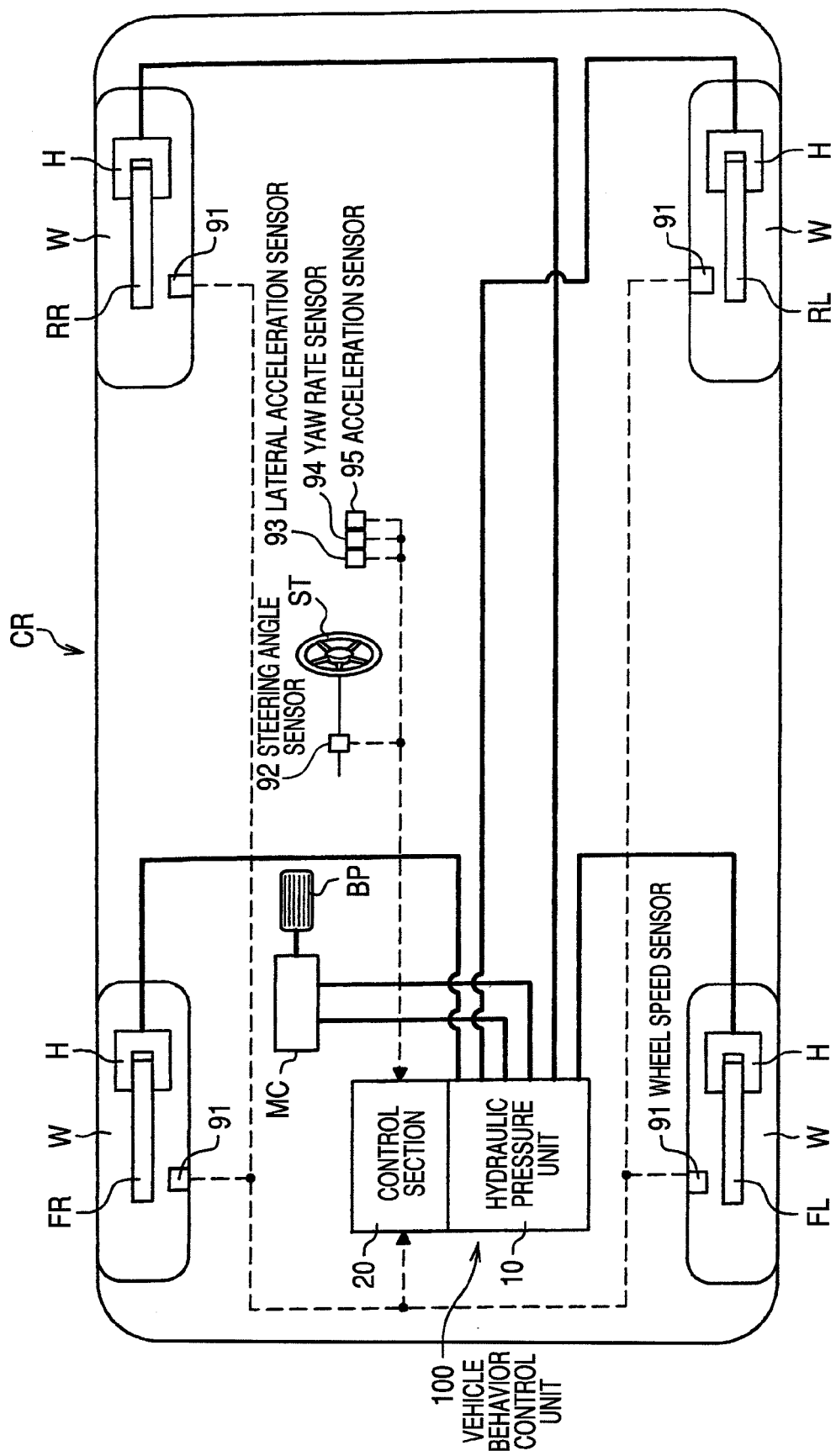
FIG. 1 is a structural view showing a vehicle having a vehicle behavior control apparatus of an embodiment of the present invention.
Figure 2:
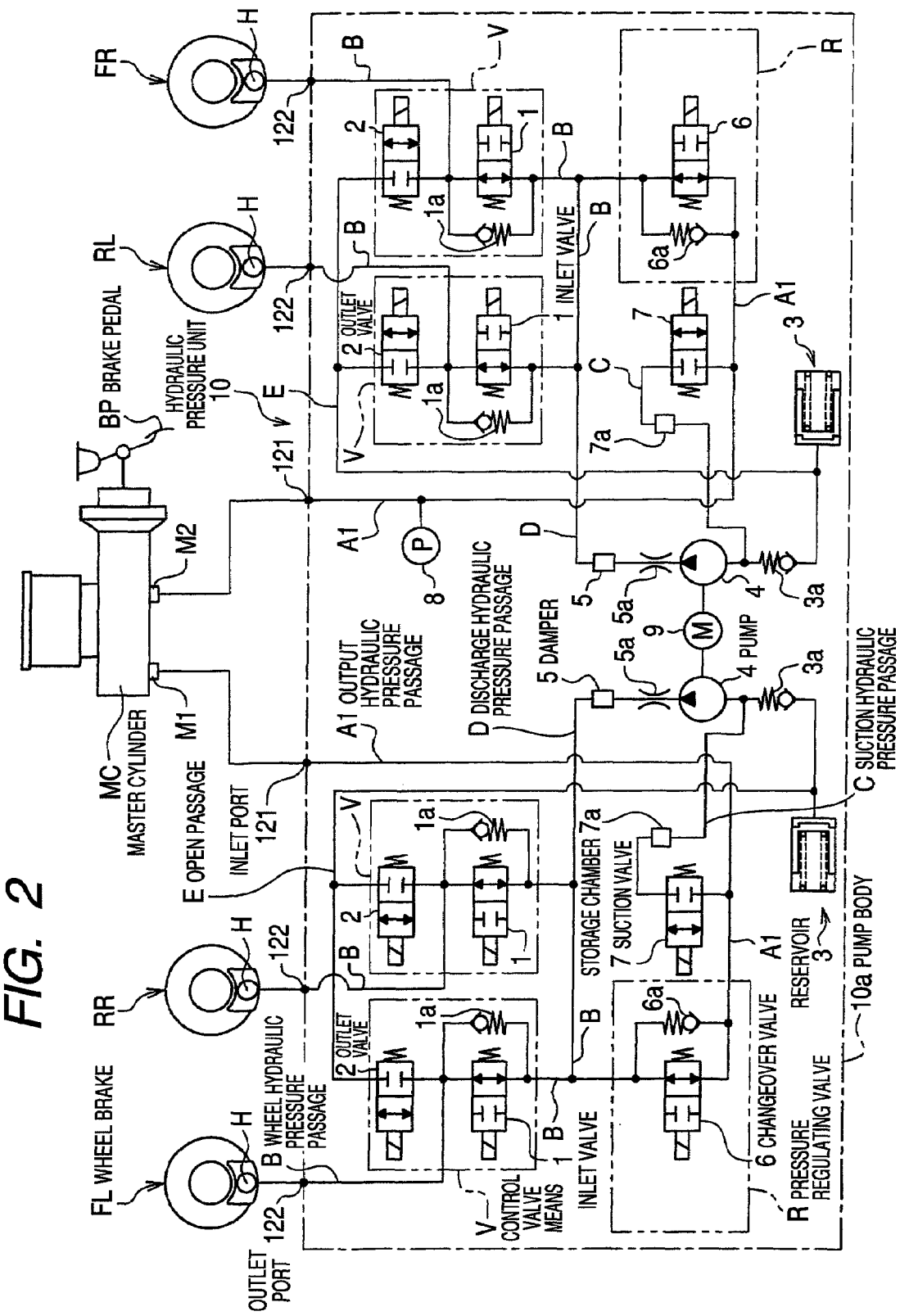
FIG. 2 is a structural view showing a brake hydraulic pressure circuit of the vehicle behavior control apparatus.

An embodiment of the present invention will be explained in detail accompanying with the drawings. FIG. 1 is a structural view showing a vehicle having a vehicle behavior control apparatus of an embodiment of the present invention and FIG. 2 is a structural view showing a brake hydraulic circuit of the vehicle behavior control apparatus.

As shown in FIG. 1, the vehicle behavior control apparatus 100 appropriately controls a braking force (braking hydraulic pressure) given to each wheel W of a car CR. The vehicle behavior control apparatus 100 includes: a hydraulic pressure unit 10 having an fluid passage (hydraulic passage) and various parts; and a control section 20 for appropriately controlling various parts in the hydraulic pressure unit 10.

The control section 20 is connected with a wheel speed sensors 91 for detecting the wheel speed of the wheels W, a steering angle sensor 92 (steering angle detection means) for detecting a steering angle of the steering ST, a lateral acceleration sensor 93 (lateral acceleration detection means) for detecting an acceleration (lateral acceleration) applied in the lateral direction of the car CR, a yaw rate sensor 94 (yaw rate detection means) for detecting a turning angular speed (actual yaw rate) of the car CR and an acceleration sensor 95 for detecting an acceleration applied in the longitudinal direction of the car CR. Results of the detection of the sensors 91 to 95 are outputted to the control section 20.

For example, the control section 20 includes CPU, RAM, ROM and an input and output circuit. Controlling is carried out when the calculation processing is executed according to the inputted values from the wheel speed sensor 91, the steering angle sensor 92, the lateral acceleration sensor 93, the yaw rate sensor 94 and the acceleration sensor 95 and also according to programs and data stored in ROM.

The wheel cylinders H compose a hydraulic pressure device for converting brake hydraulic pressure generated by the master cylinder MC and the vehicle behavior control apparatus 100 into operation forces of the wheel brakes FR, FL, RR and RL provided in the wheels W, respectively. The respective wheel cylinders H are connected to the hydraulic pressure unit 10 of the vehicle behavior control apparatus 100 through the piping.

As shown in FIG. 2, the hydraulic pressure unit 10 is arranged between the master cylinder MC, which is a hydraulic pressure source for generating brake hydraulic pressure corresponding to the pedal effort given to the brake pedal BP by a driver, and the wheel brakes FR, FL, RR and RL. The hydraulic pressure unit 10 includes: a pump body 10a that is a base body having an fluid passage in which brake fluid is circulated; a plurality of inlet valves 1 arranged in the fluid passage; and a plurality of outlet valves 2.

Two output ports M1 and M2 of the master cylinder MC are connected to inlet ports 121 of the pump body 10a. Outlet ports 122 of the pump body 10a are connected to the wheel brakes FR, FL, RR and RL. At the time of normal operation, a communicated fluid passage is formed from the inlet port 121 to the outlet port 122 in the pump body 10a. Therefore, the pedal effort of the brake pedal BP is transmitted to the wheel brakes FL, RR, RL, and FR.

The fluid passage starting at the output port M1 is communicated with the wheel brake FL of the left front wheel and the wheel brake RR of the right rear wheel. The fluid passage starting at the output port M2 is communicated with the wheel brake FR of the right front wheel and the wheel brake RL of the left rear wheel. Hereinafter, the fluid passage starting at the output port M1 is referred to as "first system" and the fluid passage starting at the output port M2 is referred to as "second system".

In the hydraulic pressure unit 10, the first system includes two control valve means V corresponding to the wheel brakes FL, RR. In the same manner, the second system includes two control valve means V corresponding to the wheel brakes RL, FR. In the hydraulic pressure unit 10, the first and the second system respectively include: a reservoir 3, pump 4, damper 5, orifice 5a, pressure regulating valve (regulator) R, suction valve 7 and storage chamber 7a. Further, the hydraulic pressure unit 10 includes a motor 9 commonly used for driving the pumps 4 of the first and the second systems. This motor 9 is a motor of which rotating speed is controllable. In the present embodiment, the pressure sensor 8 is arranged only in the second system.

In the following explanations, the fluid passages from the output ports M1 and M2 of the master cylinder MC to the pressure regulating valves R are referred to as "an output hydraulic pressure passage A1". The fluid passages from the pressure regulating valve R of the first system to the wheel brakes FL, RR and the fluid passages from the pressure regulating valve R of the second system to the wheel brakes RL, FR are respectively referred to as "a wheel hydraulic pressure passage B". The fluid passage from the output hydraulic pressure circuit A1 to the pump 4 is referred to as "a suction hydraulic pressure passage C". The fluid passage from the pump 4 to the wheel hydraulic pressure passage B is referred to as "a discharge hydraulic pressure passage D". Further, the fluid passage from the wheel hydraulic pressure passage B to the suction hydraulic pressure passage C is referred to as "an open passage E".

The control valve means V is a valve for controlling hydraulic pressure from the master cylinder MC or the pump 4 to the wheel brakes FL, RR, RL and FR (in detail, to the wheel cylinders H). The control valve means V can increase, hold or decrease the pressure of the wheel cylinder H. For this purpose, the control valve means V includes an inlet valve 1, an outlet valve 2 and a check valve 1a.

The inlet valve 1 is a normally-open electromagnetic valve arranged between each wheel brake FL, RR, RL and FR and the master cylinder MC, that is, the inlet valve 1 is arranged in the wheel hydraulic pressure passage B. The inlet valve 1 is open at the time of normal operation and the brake hydraulic pressure is transmitted from the master cylinder MC to each wheel brake FL, FR, RL, RR. When the wheel W is going to lock, the inlet valve 1 is closed by the control section 20, and the brake hydraulic pressure to be transmitted from the brake pedal BP to each wheel brake FL, FR, RL, and RR is shut off.

The outlet valve 2 is a normally-closed electromagnetic valve arranged between each wheel brake FL, RR, RL and FR and each reservoir 3, that is, the outlet valve 2 is arranged between the wheel hydraulic pressure passage B and the open passage E. The output valve 2 is closed at the time of normal operation. However, when the wheel W is going to lock, the outlet valve 2 is opened by the control section 20, and the brake hydraulic pressure acting on each wheel brake FL, FR, RL, and RR is released to each reservoir 3.

The check valve 1a is connected in parallel with each inlet valve 1. This check valve 1a is a one-way valve to allow an inflow of the brake fluid from each wheel brake FL, FR, RL, RR to the master cylinder MC. When an input of the hydraulic pressure from the brake pedal BP is released, even when the inlet valve 1 is maintained in a closed condition, an inflow of the brake fluid from each wheel brake FL, FR, RL, RR to the master cylinder MC is allowed.

The reservoir 3 is arranged in the open passage E. When each outlet valve 2 is opened, the reservoir 3 absorbs the released brake hydraulic pressure. Between the reservoir 3 and the pump 4, the check valve 3a which allows only a flow of the brake fluid from the reservoir 3 to the pump 4 is provided.

The pump 4 is interposed between the suction hydraulic pressure passage C, which is communicated with the outlet hydraulic pressure passage A1, and the discharge hydraulic pressure passage D which is communicated with the wheel hydraulic pressure passage B. The pump 4 sucks the brake fluid stored in the reservoir 3 and discharges it into the discharge hydraulic pressure passage D. Due to this, the brake fluid absorbed by the reservoir 3 can be returned to the master cylinder MC and even when the driver does not operate the brake pedal BP, the brake hydraulic pressure is generated and a braking force can be generated in each wheel brake FL, RR, RL and FR.

An amount of discharge of the brake fluid of the pump 4 depends upon a rotating speed of the motor 9. For example, when the rotating speed of the motor 9 is increased, an amount of discharge of the brake fluid of the pump 4 is increased.

The damper 5 and the orifice 5a are cooperated with each other to damp a pulsation of the pressure of the brake fluid discharged from the pump 4 and also a pulsation generated when the pressure regulating valve R described later is operated.

The pressure regulating valve R is opened at the time of normal operation to allow a flow of the brake fluid from the output hydraulic pressure passage A1 to the wheel hydraulic pressure passage B. When the pressure in the wheel cylinder H is increased by the brake hydraulic pressure generated by the pump 4, the pressure regulating valve R is operated in such a manner that the pressure regulating valve R adjusts the pressure in the discharge hydraulic pressure passage D, the wheel hydraulic pressure passage B and the wheel cylinder H at a value not more than a setting value while shutting off a flow of the brake fluid. For this purpose, the pressure regulating valve R is provided with the changeover valve 6 and the check valve 6a.

The changeover valve 6 is a normally-open linear solenoid valve interposed between the output hydraulic pressure passage A1, which is communicated with the master cylinder MC, and the wheel hydraulic pressure passage B which is communicated with each wheel brake FL, FR, RL, RR. Although the detail is not shown in the drawing, a valve body of the changeover valve 6 is urged to the wheel hydraulic pressure passage B side and the wheel cylinder H side by an electromagnetic force corresponding to an electric current. When the pressure in the wheel hydraulic pressure passage B is increased to be higher than the pressure in the output hydraulic pressure passage A1 by a predetermined value (this value is decided by an electric current), the brake fluid is released from the wheel hydraulic pressure passage B toward the output hydraulic pressure passage A1. Accordingly, the pressure in the wheel hydraulic pressure passage B can be adjusted at predetermined pressure.

The check valve 6a is connected in parallel with each changeover valve 6. This check valve 6a is a one-way valve to allow an inflow of the brake fluid from the output hydraulic pressure passage A1 to the wheel hydraulic pressure passage B.

The suction valve 7 is a normally-closed electromagnetic valve provided in the suction hydraulic pressure passage C and changes over the suction hydraulic pressure passage C between an open state and a closed state. When the changeover valve 6 is closed, that is, when the brake hydraulic pressure is applied to each wheel brake FL, FR, RL, RR when the driver does not operate the brake pedal BP, the suction valve 7 is opened by the control section 20.

The reservoir chamber 7a is provided between the pump 4 and the suction valve 7 in the suction hydraulic pressure passage C. This reservoir chamber 7a stores the brake fluid and makes a volume of the brake fluid stored in the suction hydraulic pressure passage C increase substantially.

The pressure sensor 8 detects the brake hydraulic pressure in the output hydraulic pressure passage A1 in the second system and its detection result is inputted to the control section 20.

Figure 3:
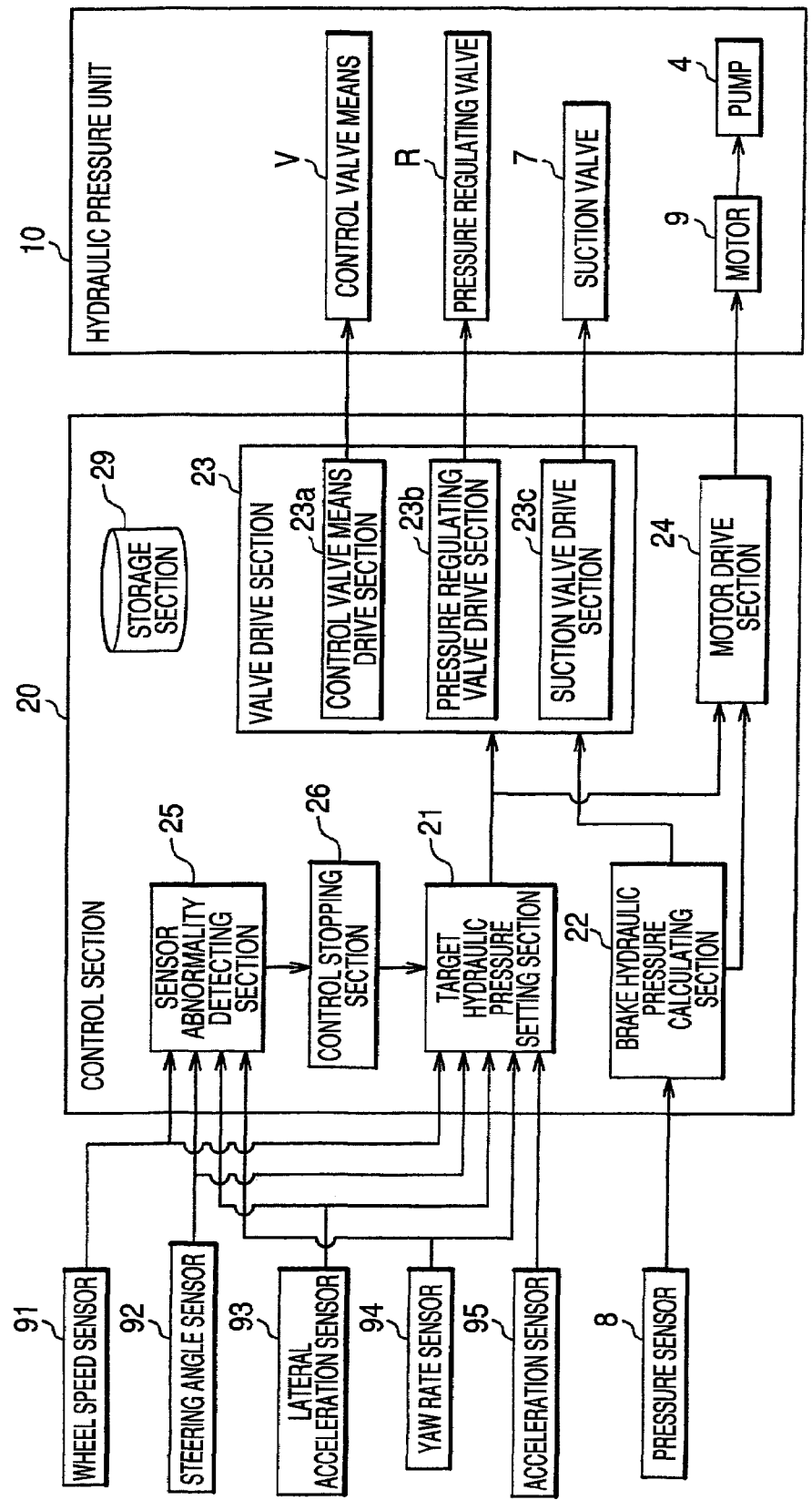
FIG. 3 is a block diagram showing a structure of a control section.
Figure 4:
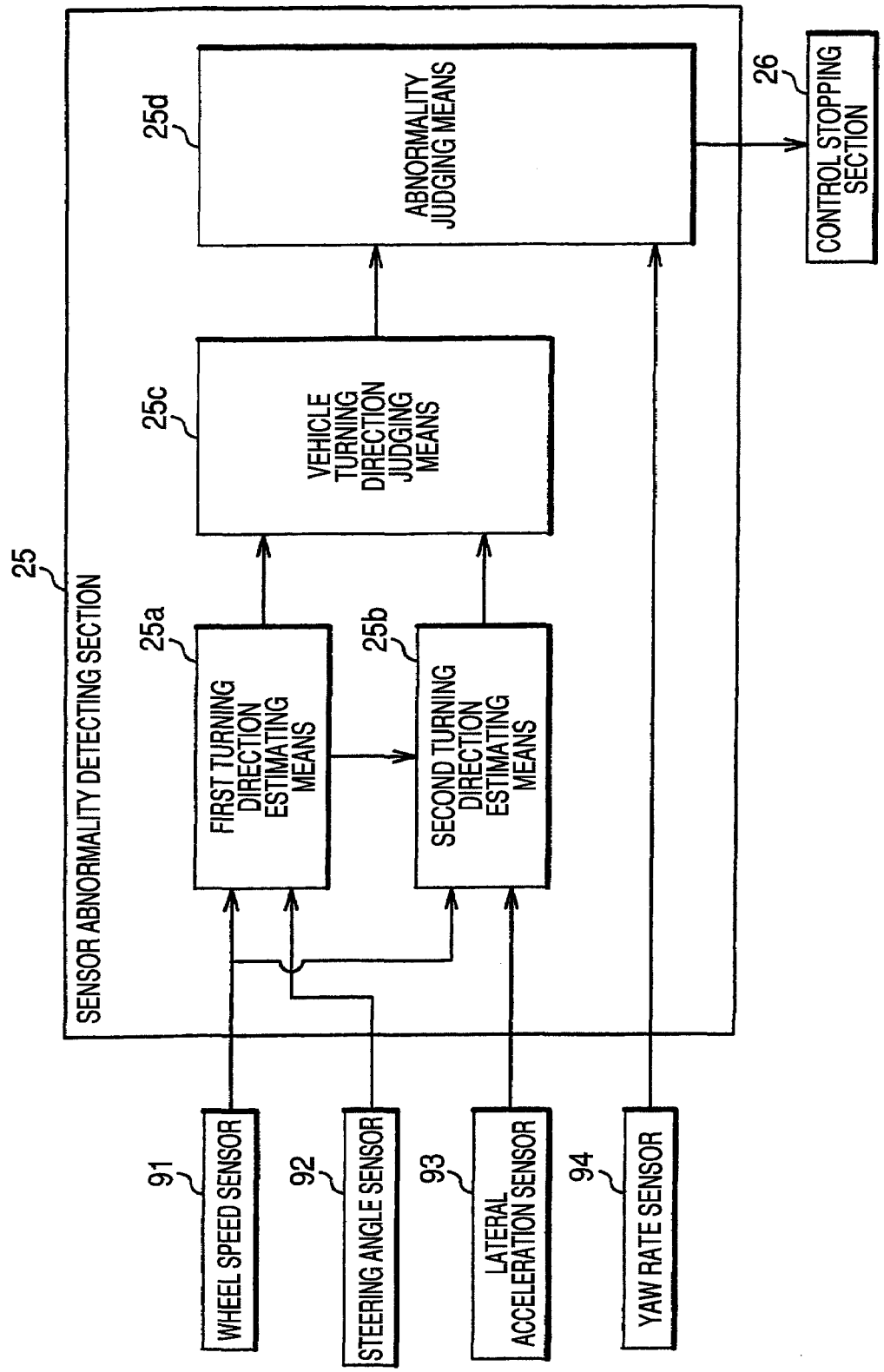
FIG. 4 is a detailed block diagram showing a structure of a sensor abnormality detecting section.
Figure 5:
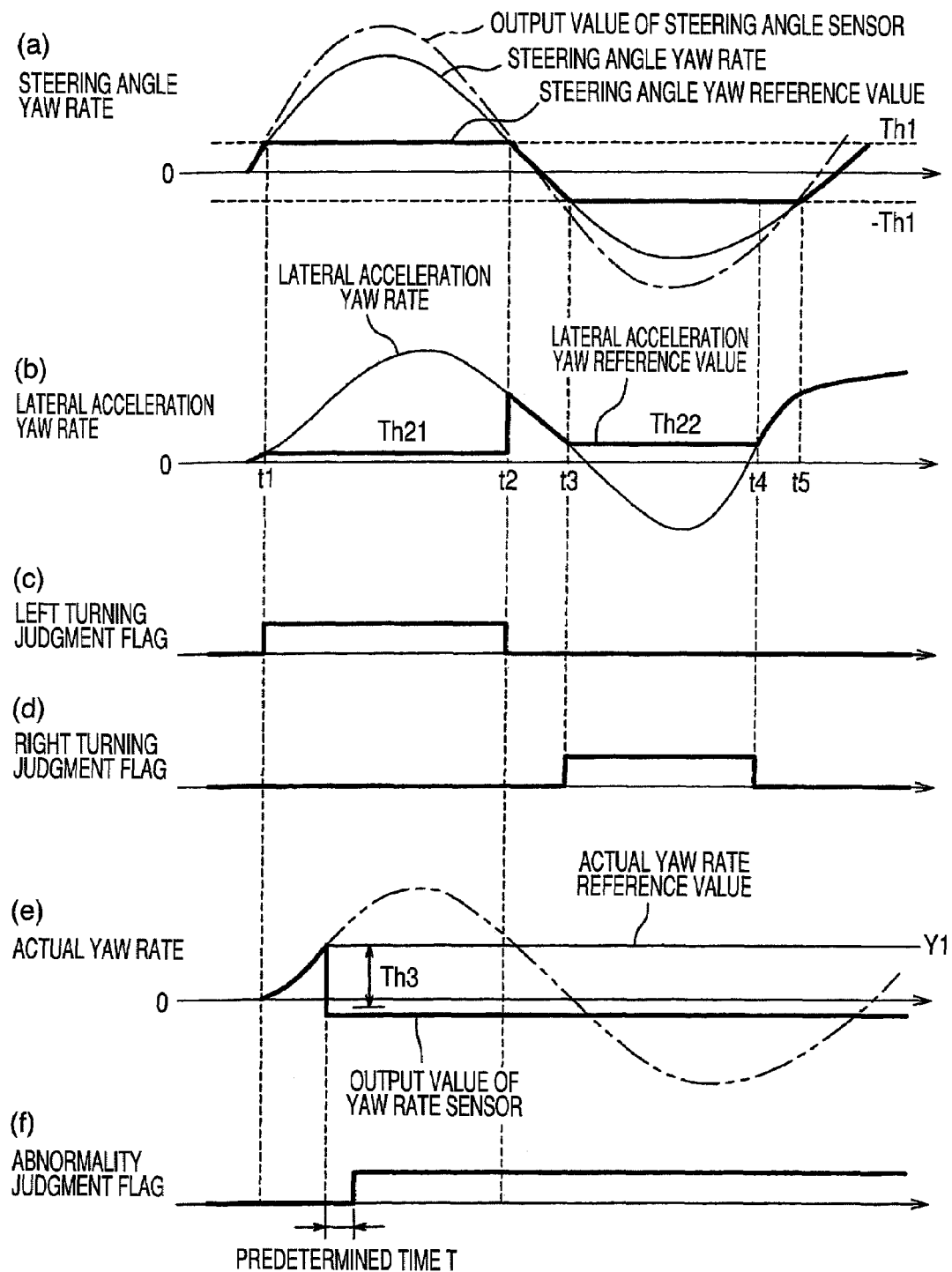
FIG. 5(a) is a time chart showing an output value of a steering angle sensor, a yaw rate of a steering angle and a reference value of yawing of a steering angle.
FIG. 5(b) is a time chart showing a yaw rate of the lateral acceleration and a reference value of yawing of the lateral acceleration.
FIG. 5(c) is a time chart showing a left turning judgment flag.
FIG. 5(d) is a time chart showing a right turning judgment flag.
FIG. 5(e) is a time chart showing an output value of a yaw rate sensor and a reference value of an actual yaw rate.
FIG. 5(f) is a time chart showing an abnormality judgment flag.

Next, the control section 20 is explained in detail. In the drawings, FIG. 3 is a block diagram showing a structure of a control section. FIG. 4 is a detailed block diagram showing a structure of a sensor abnormality detecting section. FIG. 5(a) is a time chart showing an output value of a steering angle sensor, a yaw rate of a steering angle and a reference value of yawing of a steering angle, FIG. 5(b) is a time chart showing a yaw rate of the lateral acceleration and a reference value of yawing of the lateral acceleration, FIG. 5(c) is a time chart showing a left turning judgment flag, FIG. 5(d) is a time chart showing a right turning judgment flag, FIG. 5(e) is a time chart showing an output value of a yaw rate sensor and a reference value of an actual yaw rate, and FIG. 5(f) is a time chart showing an abnormality judgment flag.

As shown in FIG. 3, according to the signal inputted from each sensor 91 to 95, the control section 20 controls the opening and closing operation of the control valve means V in the hydraulic pressure unit 10, the changeover valve 6 (the pressure regulating valve R) and the suction valve 7, and the operation of the motor 9 so as to control the operation of each wheel brake FL, RR, RL and FR. The control section 20 includes: a target hydraulic pressure setting section 21, a brake hydraulic pressure calculating section 22, a valve driving section 23, a motor driving section 24, a sensor abnormality detecting section 25, a control stopping section 26 and a storage section 29.

The target hydraulic pressure setting section 21 selects control logic according to a signal inputted from each sensor 91 to 95. According to the control logic, a target hydraulic pressure of each wheel brake FL, RR, RL and FR is set. This setting method may be a conventionally well known method, that is, this setting method is not particularly limited to the specific method.

An example is described as follows. A vehicular speed of a car CR is calculated from the wheel speed of four wheels W and a ratio of slippage is calculated from the wheel speed and the vehicular speed. Further, a compound acceleration is calculated based on the lateral acceleration and the acceleration in the longitudinal direction of the car CR and a coefficient of friction of a road surface is estimated from this compound acceleration. Then, a target hydraulic pressure of each wheel brake FL, RR, RL and FR can be set according to the coefficient of friction, the ratio of slippage and the present brake hydraulic pressure of the wheel cylinder H.

The target hydraulic pressure setting section 21 compares the target hydraulic pressure of the wheel brakes FL, RR, RL and FR in the same system with each other and the highest target hydraulic pressure is set at the target hydraulic pressure of the wheel cylinder H in the system.

The thus set target hydraulic pressure is outputted to the valve driving section 23 and the motor driving section 24.

The brake hydraulic pressure calculating section 22 calculates the brake hydraulic pressure (the estimated brake hydraulic pressure) of each wheel brake FL, RR, RL and FR according to the master cylinder pressure detected by the pressure sensor 8, that is, the master cylinder pressure and an amount of drive of each electromagnetic valve 1, 2, 6 executed by the valve drive section 23.

The thus calculated brake hydraulic pressure is outputted to the valve drive section 23 and the motor drive section 24.

The valve drive section 23 controls drives of each control valve means V, the pressure regulating valve R and the suction valve 7 according to each target hydraulic pressure and each estimated brake hydraulic pressure. In detail, the valve drive section 23 outputs pulse signals for operating the inlet valve 1, the outlet valve 2, the changeover valve 6 and the suction valve 7 in the hydraulic pressure unit 10 to the hydraulic pressure unit 10 so that the brake hydraulic pressure of the wheel cylinder H of each wheel brake FL, RR, RL and FR can be made to coincide with the target hydraulic pressure. Concerning this pulse signal, for example, the larger the difference between the present brake hydraulic pressure of the wheel cylinder H and the target hydraulic pressure is, the more pulses are outputted.

The valve drive section 23 described above includes: a control valve means drive section 23a for driving the control valve means V; a pressure regulating valve drive section 23b for driving the pressure regulating valve R; and a suction valve drive section 23c for driving the suction valve 7.

When the pressure of the wheel cylinder H must be increased due to a difference between the target hydraulic pressure and the estimated brake hydraulic pressure, the control valve means drive section 23a does not feed the electric currents to both the inlet valve 1 and the outlet valve 2, so that the inlet valve 1 is opened and the outlet valve 2 is closed. When the pressure of the wheel cylinder H must be decreased, pulse signals are sent to both the inlet valve 1 and the outlet valve 2, so that the inlet valve 1 is closed and the outlet valve 2 is opened. Thus, the brake fluid in the wheel cylinder H is made to flow out from the outlet valve 2. Further, when the pressure in the wheel cylinder H must be held, a pulse signal is sent to the inlet valve 1 and no electric current is fed to the outlet valve 2, and both the inlet valve 1 and the outlet valve 2 are closed.

At the time of normal operation, the pressure regulating valve drive section 23b does not feed the electric current to the pressure regulating valve R. When a target hydraulic pressure has been inputted from the target hydraulic pressure setting section 21, an electric current to be fed to the pressure regulating valve R is decided and a pulse signal is outputted. When the pulse signal is outputted to the pressure regulating valve R, by an electromagnetic force corresponding to the electric current, a valve body of the pressure regulating valve R (the changeover valve 6) is urged onto the wheel hydraulic pressure passage B side. When the pressure on the wheel hydraulic pressure passage B side is increased by the pressurizing executed by the pump 4 to a value not less than the urging force of the valve body, the brake fluid can be released to the output hydraulic pressure passage A1 side. Thus, the pressure of the wheel hydraulic pressure passage B and the discharge hydraulic pressure passage D can be adjusted at a predetermined pressure.

The suction valve drive section 23c does not feed an electric current to the suction valve 7. When the pressure in the wheel cylinder H must be increased from the target hydraulic pressure outputted from the target hydraulic pressure setting section 21 and also when the master cylinder pressure detected by the pressure sensor 8 is lower than the target hydraulic pressure, a pulse signal is outputted to the suction valve 7 so that the pump 4 can execute the pressurizing operation. Thus, the suction valve 7 is opened and the brake fluid is sucked from the master cylinder MC into the pump 4.

The motor drive section 24 decides a rotating speed of the motor 9 according to the target hydraulic pressure and the estimated brake hydraulic pressure and the motor 9 is driven. That is, the motor drive section 24 drives the motor 9 by the rotating speed control. For example, the rotating speed of the motor 9 is controlled by the duty control.

According to the signals inputted from the wheel speed sensor 91, the steering angle sensor 92 and the lateral acceleration sensor 93, the sensor abnormality detecting section 25 judges a turning direction of the car CR and compares the turning direction with a direction of the actual yaw rate inputted from the yaw rate sensor 94 so as to judge whether the yaw rate sensor 94 is abnormal.

As shown in FIG. 4, the sensor abnormality detecting section 25 includes: a first turning direction estimating means 25a; a second turning direction estimating means 25b; a vehicle turning direction judging means 25c; and an abnormality judging means 25d.

The first turning direction estimating means 25a estimates the first yaw rate (hereinafter, referred to as a steering angle yaw rate) from the output values of the wheel speed sensor 91 and the steering angle sensor 92 (the wheel speed and the steering angle) by a known method. When an absolute value of this steering angle yaw rate is not less than the first threshold value (for example, in a time period between t1 and t2), the first turning direction is estimated from the positive and the negative of the steering angle yaw rate.

In this embodiment, in order to estimate the second turning direction described later, the steering angle yaw reference value, in which the first threshold value Th1 is reflected, is set. As shown in FIG. 5(a), in principle, the steering angle yaw reference value follows the steering angle yaw rate. However, the value is restricted in such a manner that on the positive side, the first threshold value Th1 is set to be the upper limit and on the negative side, −Th1 is set to be the lower limit.

When the steering angle yaw reference value is subtracted from the steering angle yaw rate and the difference value is positive, it is estimated that the first turning direction is the left direction. On the other hand, when the difference value is negative, it is estimated that the first turning direction is the right direction.

Here, the first threshold value Th1 is a fixed value previously determined by an experiment or a simulation according to a size and type of the car CR so that the car CR can actually start turning at the point of time when an absolute value of the steering angle yaw rate exceeds this value (Th1). Accordingly, when the absolute value of the steering angle yaw rate is lower than the first threshold value Th1, it can be assumed that the car CR is traveling straight.

The second turning direction estimating means 25b estimates the second yaw rate (hereinafter, referred to as a lateral acceleration yaw rate) from the output values of the wheel speed sensor 91 and the lateral acceleration sensor 93 by a known method. The second turning direction is estimated from the positive and the negative of a difference between the lateral acceleration yaw rate when the lateral acceleration yaw rate is not less than or not more than the second threshold value (in a time period between the time t1 and t2 or between the time t3 and t4) and the second threshold value.

In detail, as shown in FIGS. 5(a) and 5(b), the lateral acceleration yaw rate at the point of time when the steering angle yaw reference value starts maintaining Th1 or −Th1, that is, the lateral acceleration yaw rate at the point of time when an absolute value of the steering angle yaw rate exceeds the first threshold value Th1 is set as the second threshold value Th21, Th22. In the time period (the time t1 to t2) in which the steering angle yaw reference value is maintained at Th1, Th21 is set at the lateral acceleration yaw reference value and in the time period (the time t3 to t4) in which the steering angle yaw reference value is maintained at −Th1, Th22 is set at the lateral acceleration yaw reference value. In the time periods except for the above, the lateral acceleration yaw rate is set at the lateral acceleration yaw reference value. In a time period from the time t4 to t5, that is, from the point of time at which the lateral acceleration yaw rate is changed with respect to the lateral acceleration yaw reference value which is maintained at a constant value (Th22) until that time, the lateral acceleration yaw rate is set as a lateral acceleration yaw reference value.

When the lateral acceleration yaw reference value is subtracted from the lateral acceleration yaw rate and the difference is positive, it is estimated that the second turning direction is the left direction. When the difference is negative, it is estimated that the second turning direction is the right direction.

The wheel turning direction judging means 25c compares the first turning direction with the second turning direction. When the directions are the same, it is judged that the direction concerned is the turning direction of the car CR. In detail, as shown in FIG. 5(c), when both the first turning direction and the second turning direction are the left direction, it is actually judged that the vehicle is actually turning to the left. As shown in FIG. 5(d), when both the first turning direction and the second turning direction are the right direction, it is judged that the vehicle is actually turning to the right.

The abnormality judging means 25d compares the turning direction of the car CR with the direction of the output value (actual yaw rate) of the yaw rate sensor 94 and judges whether the directions are the same so as to judge whether the yaw rate sensor 94 is abnormal.

In detail, for example, as shown in FIG. 5(e), first, in the circumstances (in the time period from the time t1 to t2) in which it is judged that the car CR is turning in the left direction, when an amount of the change of the output value (the actual yaw rate) of the yaw rate sensor 94 per predetermined unit time X is not less than the third threshold value Th3, the output value Y1 of the yaw rate sensor 94 right before the actual yaw rate changes is maintained and set as the actual yaw rate reference value.

Next, the actual yaw rate reference value is subtracted from the actual yaw rate after the change. When the difference is positive, it is estimated that the turning direction shown by the actual yaw rate is the left direction. When the difference is negative, it is estimated that the turning direction shown by the actual yaw rate is the right direction. The turning direction shown by the actual yaw rate is compared with the turning direction of the car CR judged by the vehicle turning direction judging means 25c.

As a result, when it is judged that the turning direction indicated by the actual yaw rate is the same as the turning direction of the car CR, it is judged that an abnormality is not caused in the yaw rate sensor 94.

On the other hand, when the turning direction indicated by the actual yaw rate is different from the turning direction of the car CR, as shown in FIG. 5(f), when the state continues for a period of time not less than a predetermined period of time T, it is judged that an abnormality is causes in the yaw rate sensor 94 and an abnormality detection signal is outputted to the control stopping section 26 shown in FIG. 3.

Here, the third threshold value Th3 is a value determined according to an amount of the change of the actual yaw rate which can not be generated in the normal traveling condition of the car CR. For example, the third threshold value Th3 can be previously determined by an experiment or simulation corresponding to the size and type of the car CR.

The unit time X can be appropriately set according to the characteristic of the yaw rate sensor. For example, when using a yaw rate sensor in which it takes time from when an abnormality is generated to when the generation of the abnormality is reflected on the output value, it is desirable that the unit time X is set long.

In this embodiment, the occurrence of an abnormality is judged in the yaw rate sensor 94 from an amount of the change of the actual yaw rate per the predetermined unit time X. However, the judging method of judging an abnormality of the yaw rate sensor 94 is not limited to the above specific method. For example, the occurrence of an abnormality of the yaw rate sensor can be synthetically judged by monitoring an amount of the change per unit time X for a predetermined period of time.

When an abnormality detecting signal is inputted from the sensor abnormality detecting section 25 (the abnormality judging means 25d), the control stopping section 26 stops setting the target hydraulic pressure by the target hydraulic pressure setting section 21. Thus, driving of the control valve means V, the pressure regulating valve R, the suction valve 7 and the motor 9 is stopped. Therefore, it is possible to prevent the control of the car CR from being affected by the abnormality of the yaw rate sensor 94.

Figure 6:
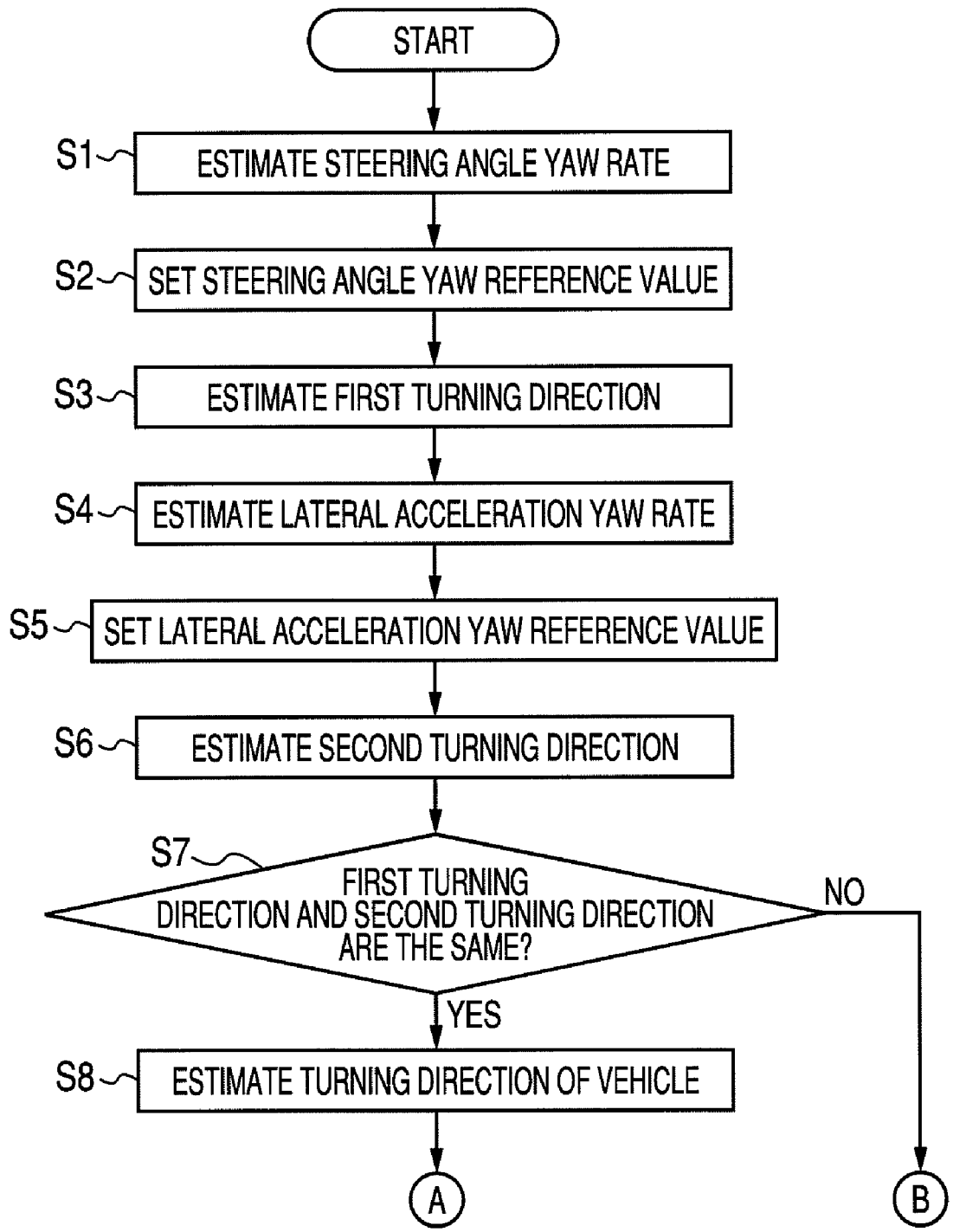
FIG. 6 is a flow chart explaining the processing executed in a control section.
Figure 7:
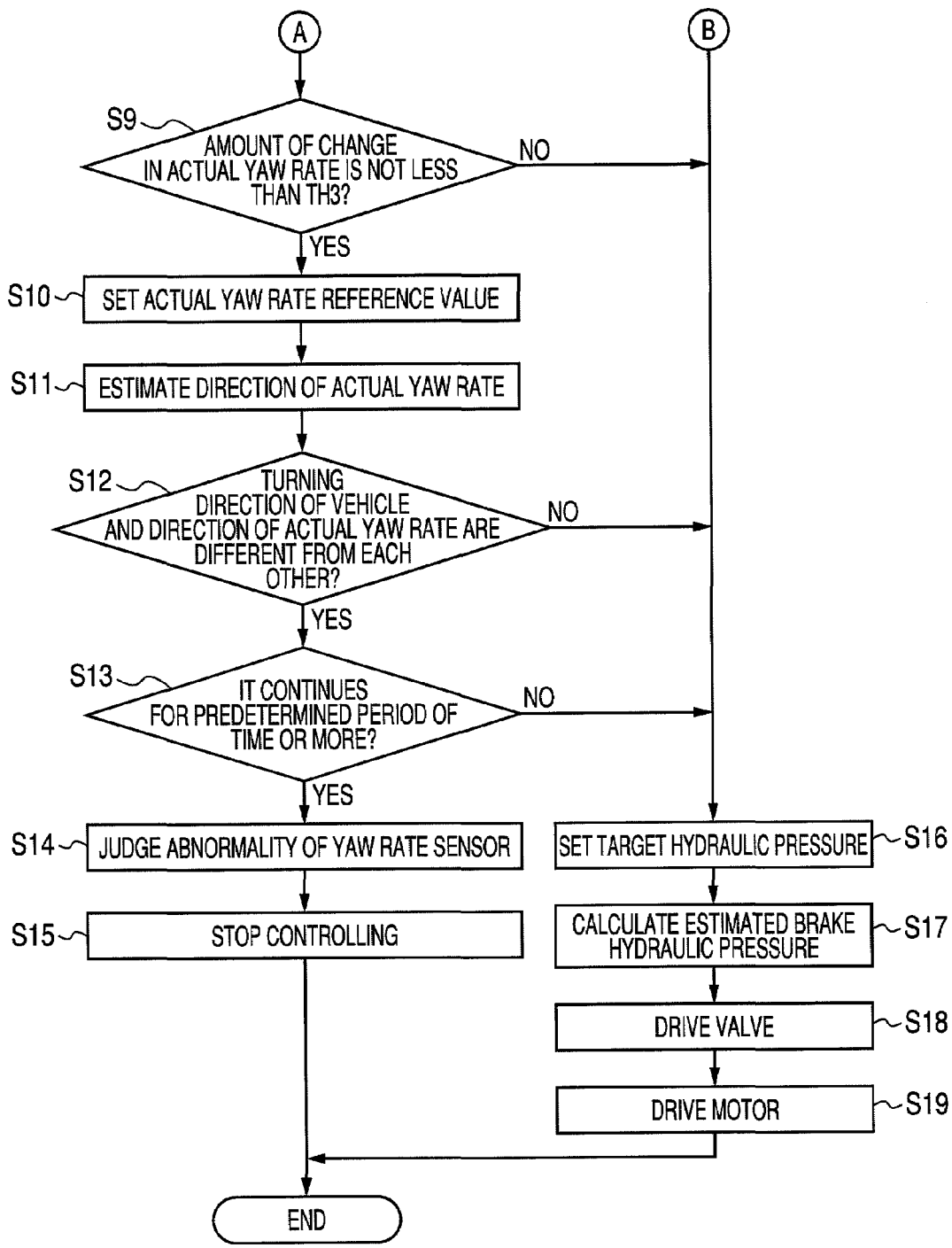
FIG. 7 is a flow chart explaining the processing executed in a control section.

Next, explanations will be made into an operation of the control section 20 of the vehicle behavior control apparatus 100 composed as described above. FIGS. 6 and 7 are flow charts for explaining the processing executed in the control section.

First, as shown in FIG. 6, the control section 20 estimates a steering angle yaw rate from the output values of the wheel speed sensor 91 and the steering angle sensor 92 (S1). Next, the steering angle yaw reference value is set from the steering angle yaw rate and the first threshold value Th1 (S2). Then, the steering angle yaw reference value is subtracted from the steering angle yaw rate. From the positive and the negative of the difference, the first turning direction is estimated (S3).

The control section 20 estimates a lateral acceleration rate from the output values of the wheel speed sensor 91 and the lateral acceleration sensor 93 (S4). Next, the second threshold values Th21, Th22 are set from the steering angle yaw reference value and further the lateral acceleration yaw reference value is set from the lateral acceleration yaw rate and the second threshold values Th21, Th22 (S5). Then, the lateral acceleration yaw reference value is subtracted from the lateral acceleration yaw rate and the second turning direction is estimated from the positive and the negative of the difference (S6).

Next, the control section 20 judges whether the first turning direction and the second turning direction are in the same direction (S7). When the first turning direction and the second turning direction are not in the same direction (S7, No), the program advances to step S16 (FIG. 7) and the normal processing is executed. On the other hand, when the first turning direction and the second turning direction are in the same direction (S7, Yes), the direction concerned is estimated to be the turning direction of the car CR (S8).

Next, as shown in FIG. 7, the control section 20 judges whether an amount of the change of the actual yaw rate per unit time X is not less than the third threshold value Th3 (S9). When the amount of the change of the actual yaw rate is smaller than the third threshold value Th3, (S9, No), the program advances to step S16 and the normal processing is executed. On the other hand, the amount of the change of the actual yaw rate is not less than the third threshold value Th3, (S9, Yes), the output value Y1 right before the actual yaw rate is changed is set as the actual yaw rate reference value (S10). The actual yaw rate reference value is subtracted from the actual yaw rate and a direction of the actual yaw rate is estimated from the positive and the negative of the difference (S11).

The control section 20 compares the turning direction of the car CR with the direction of the actual yaw rate and judges whether the directions are different from each other (S12). When the turning direction of the car CR and the direction of the actual yaw rate are the same (S12, No), the program advances to step S16 and the normal processing is carried out. On the other hand, when the turning direction of the car CR and the direction of the actual yaw rate are different from each other (S12, Yes), it is judged whether the state continues for a period of time not less than the predetermined period of time T (S13). When the state continues for a period of time not less than the predetermined period of time T (S13, Yes), it is judged that an abnormality is caused in the yaw rate sensor 94 (S14). After the control section 20 has judged that the abnormality is caused in the yaw rate sensor 94, the control section 20 stops driving and controlling the control valve means V, the pressure regulating valve R, the suction valve 7 and the motor 9 (S15).

Here, when a state, in which the turning direction of the car CR and the direction of the actual yaw rate are different from each other, continues for a period of time shorter than the predetermined period of time T (S13, No), it is judged that no abnormality is caused in the yaw rate sensor 94 and the control section 20 carries out the normal processing (the processing after step S16). That is, according to the output value of each sensor 91 to 95, the target hydraulic pressure of each wheel brake FL, RR, RL and FR is set (S16). According to the output value of the pressure sensor 8 (the master cylinder pressure) and the amount of the drive of each electromagnetic valve 1, 2, 6, the brake hydraulic pressure (the estimated brake hydraulic pressure) is calculated (S17). The control section 20 drives the control valve means V, the pressure regulating valve R and the suction valve 7 according to the target hydraulic pressure and the estimated brake hydraulic pressure (S18). At the same time, the control section 20 decides a rotating speed of the motor 9 and drives it (S19). In this case, the control section 20 repeats the processing from the start to the end according to the flow charts shown in FIGS. 6 and 7.

According to the embodiment described above, the following advantages can be provided.

In the vehicle behavior control apparatus 100, when the first turning direction, which is based on the intention of the driver, and the second turning direction, which is based on the actual behavior of the car CR, are the same and only the turning direction shown by the actual yaw rate is different, it is judged that an abnormality is caused in the yaw rate sensor 94. Accordingly, an abnormality of the yaw rate sensor 94 caused while the car CR is turning can be positively judged.

The vehicle behavior control apparatus 100 judges whether an abnormality is caused in the yaw rate sensor 94 when it is judged whether the turning direction (the first and the second turning direction) of the car CR and the turning direction shown by the actual yaw rate are different from each other. Therefore, an abnormality of the yaw rate sensor 94 can be quickly judged.

When estimating the second turning direction, the vehicle behavior control apparatus 100 sets a lateral acceleration yaw reference value from the steering angle yaw rate and the first threshold value Th1. Therefore, it is possible to take into account of the steering angle ST at the time of traveling, that is a state of a road surface (an inclination in the lateral direction of the vehicle) at the time of traveling. Thus, the second turning direction can be more positively estimated and it is possible to more accurately judge the occurrence of an abnormality of the yaw rate sensor 94.

The vehicle behavior control apparatus 100 estimates a direction when an amount of the change of the actual yaw rate is not less than the third threshold value Th3. Therefore, it is possible to prevent the occurrence of an erroneous judgment. The direction of the actual yaw rate is quantitatively estimated based on the actual yaw rate reference value. Therefore, the direction of the actual yaw rate can be more accurately estimated. Thus, an abnormality of the yaw rate detection means can be more accurately judged.

The vehicle behavior control apparatus 100 judges an abnormality when a state that the turning direction of the car CR and the direction of the actual yaw rate are different from each other continues for not less than a predetermined period of time T. Therefore, the occurrence of an erroneous judgment can be prevented and an abnormality of the yaw rate sensor 94 can be more positively judged.

The embodiment of the present invention is described above. However, it should be noted that the present invention is not limited to the above specific embodiment. Concerning the specific structure, variations can be made without departing from the scope and spirit of the present invention.

In the embodiment described above, the steering angle yaw reference value is set from the steering angle yaw rate and the first threshold value Th1 and the first turning direction is estimated from the positive and the negative of the difference between the steering angle yaw rate and the steering angle yaw reference value. However, it should be noted that the present invention is not limited to the above specific structure. For example, it is possible to estimate from the positive and the negative of the steering angle yaw rate when an absolute value of the steering angle yaw rate is simply increased higher than the first threshold value Th1. That is, when the steering angle yaw rate is positive, it is estimated that the first turning direction is the left direction. When the steering angle yaw rate is negative, it is estimated that the first turning direction is the right direction.

In the embodiment described above, the second threshold values Th21, Th22 are set from the lateral acceleration yaw rate, the steering angle yaw rate and the first threshold value Th1. However, the present invention is not limited to the above specific embodiment. The second threshold value may be a fixed value previously determined by an experiment and simulation. In order to take into account of an inclination of a road surface (an inclination in the lateral direction of the vehicle), an output value of the lateral acceleration sensor 93 may be monitored. When a state, in which the output value is not zero, continues for a predetermined period of time, the second threshold value may be changed corresponding to the output value of the lateral acceleration sensor 93.

In the embodiment described above, when an amount of the change in the actual yaw rate is not less than the third threshold value Th3, the reference value of the actual yaw rate is set and a direction of the actual yaw rate is estimated from the positive and the negative of the difference between the actual yaw rate after the change and the actual yaw rate reference value. However, the present invention is not limited to the above specific embodiment. For example, the direction of the actual yaw rate may be simply estimated from the positive and the negative of the actual yaw rate. That is, when the actual yaw rate is positive, it is estimated that the direction is the left direction. When the actual yaw rate is negative, it is estimated that the direction is the right direction.

Thus, a direction of the yaw rate detection means can be easily and quickly estimated. Accordingly, an abnormality of the yaw rate detection means can be more quickly judged.

In this connection, in the embodiment described above, when the difference between each yaw rate and each reference value, the steering angle yaw rate and the actual yaw rate are positive, the direction is estimated to be the left direction, and when the difference between each yaw rate and each reference value, the steering angle yaw rate and the actual yaw rate are negative, the direction is estimated to be the right direction. However, the present invention is not limited to the above specific embodiment. That is, it is just previously decided that when it is positive, it is estimated the left direction and when it is negative, it is estimated the right direction. Of course, for example, it is adaptable that when it is positive, it may be estimated the right direction, and when it is negative, it may be estimated the left direction.

In the above embodiment, when a state that the turning direction of the car CR and the actual yaw rate direction are different from each other continues for not less than the predetermined period of time T, it is judged that an abnormality is caused in the yaw rate sensor 94. However, the present invention is not limited to the above specific embodiment. For example, at the point of time when the turning direction of the vehicle and the actual yaw rate direction become different from each other, it may be judged that an abnormality is caused in the yaw rate sensor.

In the embodiment described above, when an abnormality is caused in the yaw rate sensor 94, an abnormality detecting signal is outputted to the control stopping section 26 and the setting of the target hydraulic pressure by the target hydraulic pressure setting section 21 is stopped and the driving of the control valve means V, the pressure regulating valve R, the suction valve 7 and the motor 9 is stopped. However, the control to be carried out at the time of the occurrence of an abnormality of the yaw rate sensor is not limited to the above control. For example, when the vehicle is provided with a plurality of yaw rate detection means for detecting an actual yaw rate, an output value outputted from the yaw rate detection means, which is judged to be abnormal, may be shut down and the control may be continued according to an output value outputted from the other yaw rate detection means. Alternatively, the control may be continued by changing over the yaw rate detection means to a spare yaw rate detection means. Alternatively, when the driver does not operate the brake pedal, only the control of generating brake hydraulic pressure (driving of the pressure regulating valve R, the suction valve 7 and the motor 9, such as control of anti-slipping) may be stopped while carrying out so-called anti-lock brake control (driving of the control valve means V).

In the embodiment described above, when the turning direction of the car CR and the actual yaw rate direction are the same, it is judged that no abnormality is caused in the yaw rate sensor 94. However, when an amount of the change of the actual yaw rate is not less than the third threshold value Th3 and the actual yaw rate after the change is fixed, it may be previously judged that an abnormality is caused in the yaw rate sensor 94. In this case, when the steering ST is steered in the opposite direction, the turning direction of the car CR and the actual yaw rate direction are different from each other. As a result, an abnormality of the yaw rate sensor 94 can be judged.

The present invention can be applied to a vehicle behavior control apparatus in which the conventionally known control method disclosed in JP-A-7-149251, in which an abnormality is judged when a difference between an estimated yaw rate and an actual yaw rate is not less than a reference value, is executed. The present invention can be also applied to a vehicle behavior control apparatus in which the conventionally known control method disclosed in JP-A-2001-171501, in which an abnormality of a sensor is judged according to a direction of the yaw moment generated in a vehicle and also according to a direction of the yaw moment generated by steering operation, is executed.

What is claimed is:

1. A vehicle behavior control apparatus comprising:
   a steering angle detection means for detecting a steering angle of a vehicle;
   a lateral acceleration detection means for detecting a lateral acceleration of the vehicle;

a yaw rate detection means for detecting an actual yaw rate of the vehicle; and a control section for controlling a behavior of the vehicle according to output values outputted from the steering angle detection means and the yaw rate detection means, wherein the control section includes:

- a first turning direction estimating means for estimating a first yaw rate according to the output value of the steering angle detection means and estimating a first turning direction from positive and negative of the first yaw rate when an absolute value of the first yaw rate concerned is not less than a first threshold value;
- a second turning direction estimating means for estimating a second yaw rate according to an output value of the lateral acceleration detection means and estimating a second turning direction from positive and negative of a difference between the second yaw rate and a second threshold value when the second yaw rate is not less than or not more than the second threshold value;
- a vehicle turning direction judging means for judging that the direction when the first turning direction and the second turning direction are the same is a turning direction of the vehicle; and
- an abnormality judging means for judging that the yaw rate detection means is abnormal when the turning direction of the vehicle and the direction of the actual yaw rate are different from each other.

2. The vehicle behavior control apparatus according to claim 1, wherein the second turning direction estimating means sets the second yaw rate, which is a yaw rate at the time when an absolute value of the first yaw rate exceeds the first threshold value, to be the second threshold value.

3. The vehicle behavior control apparatus according to claim 1, wherein the abnormality judging means judges an abnormality of the yaw rate detection means when a predetermined period of time has passed from a point of time when it is judged that the turning direction of the vehicle and the direction of the actual yaw rate are different from each other.

4. The vehicle behavior control apparatus according to claim 1, wherein the direction of the actual yaw rate is a direction estimated from positive and negative of the output value of the yaw rate detection means.

5. The vehicle behavior control apparatus according to claim 1, wherein the direction of the actual yaw rate is a direction estimated from positive and negative of a difference between the output value right before the output value of the yaw rate detection means shows a change by a value not less than the third threshold value and the output value after the output value of the yaw rate detection means has changed by a value not less than the third threshold value.

6. A vehicle behavior control apparatus comprising:

a steering angle detection unit which detects a steering angle of a vehicle;

a lateral acceleration detection unit which detects a lateral acceleration of the vehicle;

a yaw rate detection unit which detects an actual yaw rate of the vehicle; and a control section which controls a behavior of the vehicle according to output values outputted from the steering angle detection unit and the yaw rate detection unit, wherein the control section includes:

- a first turning direction estimating unit which estimates a first yaw rate according to the output value of the steering angle detection unit and estimates a first turning direction from positive and negative of the first yaw rate when an absolute value of the first yaw rate concerned is not less than a first threshold value;
- a second turning direction estimating unit which estimates a second yaw rate according to an output value of the lateral acceleration detection unit and estimates a second turning direction from positive and negative of a difference between the second yaw rate and a second threshold value when the second yaw rate is not less than or not more than the second threshold value;
- a vehicle turning direction judging unit which judges that the direction when the first turning direction and the second turning direction are the same is judged to be a turning direction of the vehicle; and
- an abnormality judging unit which judges that the yaw rate detection unit is abnormal when the turning direction of the vehicle and the direction of the actual yaw rate are different from each other.

7. The vehicle behavior control apparatus according to claim 6, wherein the second turning direction estimating unit sets the second yaw rate, which is a yaw rate at the time when an absolute value of the first yaw rate exceeds the first threshold value, to be the second threshold value.

8. The vehicle behavior control apparatus according to claim 6, wherein the abnormality judging unit judges an abnormality of the yaw rate detection unit when a predetermined period of time has passed from a point of time when it is judged that the turning direction of the vehicle and the direction of the actual yaw rate are different from each other.

9. The vehicle behavior control apparatus according to claim 6, wherein the direction of the actual yaw rate is a direction estimated from positive and negative of the output value of the yaw rate detection unit.

10. The vehicle behavior control apparatus according to claim 6, wherein the direction of the actual yaw rate is a direction estimated from positive and negative of a difference between the output value right before the output value of the yaw rate detection unit shows a change by a value not less than the third threshold value and the output value after the output value of the yaw rate detection unit has changed by a value not less than the third threshold value.

* * * * *